(12) United States Patent
Miller et al.

(10) Patent No.: US 10,250,056 B2
(45) Date of Patent: Apr. 2, 2019

(54) MULTI-FUNCTION EXTERNAL ATTACHMENT AND SAFETY CIRCUIT FOR A PORTABLE POWER CHARGER

(71) Applicant: Halo International Sezc Ltd., George Town (KY)

(72) Inventors: Garold C. Miller, Glastonbury, CT (US); Nathan Daniel Weinstein, Glastonbury, CT (US)

(73) Assignee: Halo International SEZC Ltd., Georgetown (KY)

( * ) Notice: Subject to any disclaimer, the term of this patent is extended or adjusted under 35 U.S.C. 154(b) by 0 days.

(21) Appl. No.: 15/630,390

(22) Filed: Jun. 22, 2017

(65) Prior Publication Data

US 2017/0288435 A1 Oct. 5, 2017

Related U.S. Application Data

(63) Continuation-in-part of application No. 14/848,668, filed on Sep. 9, 2015, now Pat. No. 10,075,000.

(60) Provisional application No. 62/047,884, filed on Sep. 9, 2014.

(51) Int. Cl.
*G06F 1/26* (2006.01)
*H02J 7/00* (2006.01)

(52) U.S. Cl.
CPC ............ *H02J 7/0054* (2013.01); *G06F 1/263* (2013.01); *H02J 7/007* (2013.01); *H02J 7/0021* (2013.01); *H02J 7/0031* (2013.01); *H02J 7/0045* (2013.01); *H02J 7/0047* (2013.01); *H02J 2007/0062* (2013.01)

(58) Field of Classification Search
None
See application file for complete search history.

(56) References Cited

U.S. PATENT DOCUMENTS

| 4,638,236 A | 1/1987 | Carr et al. |
| 6,362,599 B1 | 3/2002 | Turner et al. |
| 9,007,015 B1 * | 4/2015 | Nook .................... H02J 7/0054 320/105 |
| D730,280 S | 5/2015 | Koebler |

(Continued)

FOREIGN PATENT DOCUMENTS

| CN | 2659752 Y | 12/2004 |
| CN | 2803825 Y | 8/2006 |

(Continued)

OTHER PUBLICATIONS

Horizon Hobby, "E-flite EC3 Device & Battery Connector, Male/Female by E-flite (EFLAEC303)", downloaded from file history of U.S. Appl. No. 12/496,292, published on May 27, 2009, filed on the Jul. 1, 2009 IDS.*

*Primary Examiner* — David V Henze-Gongola
(74) *Attorney, Agent, or Firm* — McCormick, Paulding & Huber LLP

(57) ABSTRACT

A jump-start kit includes a control unit with a safety circuit and a portable power bank. The power bank and control unit are capable of jump-starting a 12 V car battery as well as charging at least one 5 V portable electronic device. The safety circuit includes a jump-start relay operatively connecting a power supply of the portable power bank to positive and negative jumper cable jacks, a microprocessor, and a voltage input analyzer of the control unit to enable or disable the jump-start relay.

20 Claims, 8 Drawing Sheets

(56) References Cited

U.S. PATENT DOCUMENTS

| | | | |
|---|---|---|---|
| D735,403 S | 7/2015 | Che | |
| D770,976 S | 11/2016 | Xu | |
| 2004/0196888 A1* | 10/2004 | Musbach | G01J 5/02 |
| | | | 374/120 |
| 2006/0202664 A1 | 9/2006 | Lindsey et al. | |
| 2008/0203966 A1* | 8/2008 | Ward | H02J 7/35 |
| | | | 320/104 |
| 2010/0301800 A1* | 12/2010 | Inskeep | H01M 10/48 |
| | | | 320/105 |
| 2014/0159509 A1 | 6/2014 | Inskeep | |
| 2016/0052409 A1* | 2/2016 | Sun | B60L 11/1809 |
| | | | 320/109 |

FOREIGN PATENT DOCUMENTS

| | | |
|---|---|---|
| CN | 201472270 U | 5/2010 |
| CN | 203211234 U | 9/2013 |
| CN | 203707839 U | 7/2014 |
| CN | 104118374 A | 10/2014 |

\* cited by examiner

MULTI-FUNCTION EXTERNAL ATTACHMENT AND SAFETY CIRCUIT FOR A PORTABLE POWER CHARGER

CROSS REFERENCE TO RELATED APPLICATIONS

This application is a continuation-in-part and claims benefit under 35 U.S.C. § 120 of U.S. patent application Ser. No. 14/848,668, filed Sep. 9, 2015, which claims the benefit of U.S. Provisional Application 62/047,884 filed Sep. 9, 2014, both of which are incorporated herein by reference in their entireties.

FIELD OF THE INVENTION

The present invention generally relates to power charging devices, and more particularly relates to initiating a multifunctional, portable power charger with high power capacity usable for charging portable electronic devices, laptop computers and jump starting car batteries when a standard external power source is not convenient.

DISCUSSION OF ART

Present day consumers typically own several electronic devices specifically designed for portability and use on-the-go, including, for example, a mobile phone or smart phone, a portable music player like an iPod® or an MP3 player, a tablet, a portable gaming unit, and the like. Each of these devices requires frequent recharging. Such electronic devices typically utilize a cable for connecting the device to a power source, such as a wall outlet, a car charger, an airplane charger, or a computer. However, a separate cable is usually required for each power source. Moreover, even when the device is connected to an external power source for recharging, it is difficult to continue using the device, as the device needs to remain tethered to the power source.

Similarly, a separate charging cable is usually required for connecting an electronic device with a particular power source. For example, a consumer will have one cable for charging a phone at home with an AC wall socket, and another cable for charging the phone in the car using the DC car charging socket, and perhaps additional cables for charging the phone using a computer or on an airplane. Moreover, different electronic devices often utilize different connection ports and interfaces such that a single charging cable is not compatible with multiple devices. Accordingly, a tech-savvy consumer, with several electronic devices, will usually have multiple charging cables to keep track of, and find a place to store each applicable charging cable when on the move.

Even then, the consumer may be without sufficient power to recharge a phone due to bad weather or a power outage, or may not always be in a place where a power source is readily available, or even if so, may not have the appropriate cable or adapter available to use with a particular power source. Furthermore, the consumer may not always be in a place where a power source is readily available, for example, if they are at the park, or may not have the appropriate cable or adapter available to use with a particular power source, for example, they are in the office but left their charging cable at home, or may be without sufficient power to recharge a phone or other device due to bad weather or a power outage.

On occasion, an electronic device needs a small amount of charge to finish a task before the device powers down due to insufficient battery capacity. For example, a user on a call using a mobile phone may wish to finish the call, but cannot find a power source to plug into, may not have enough time to get to a power source, or may not have the appropriate charging cable with her at the time. As noted, if the phone is plugged into a traditional power source, like a wall socket, it is difficult to continue using the phone as desired. Accordingly, what is needed is a power charger, even with a small boost of power, that is as portable as the electronic device and preferably easy to carry with the electronic device and the appropriate charging cable, and thus easily usable on-the-go.

Further, portable power chargers designed for use on-the-go must be suitable to a variety of conditions, as they are often most in need where a standard external power source is not available, and thus often needed when there is no power at all. For example, a portable power charger is especially useful when walking, camping, at the park, at the mall, or at a sporting event, where one may need to use a phone in an emergency situation. In such situations, the user doesn't want to have to carry too many objects, and this may not be able to carry a large power charger, even if portable, and one or more charging cables in addition to an electronic device (e.g., smart phone). Accordingly, a portable power charger that is easy to carry around without taking up too much space is desirable.

Still further, numerous portable power chargers are currently available on the market having a variety of shapes, sizes and designs. Commonly, however such power chargers have a limited battery capacity, and are therefore limited in what can be charged and how much charge can be provided. Typically, such portable battery chargers are designed for simply charging portable electronic devices, such as smart phones, portable music players, and possibly tablets. Few portable battery chargers are available for recharging laptop computers, as they commonly have insufficient power capacity in their own internal battery. Even fewer portable battery chargers are available for jump-starting car batteries, and those that are available on the market either are too big to transport in one's pocket, purse or bag, or simply cannot provide a sufficient amount of power to adequately jumpstart and recharge a car battery.

Regarding car battery chargers on the market, various electrical faults, fault currents and improper connections result in diminished use and durability of many such devices. Additionally, portable power chargers adapted for charging a car battery are typically always "live" in that a charge is always being provided at the outlet to which the jumper cables are connected. As a result it is easy for a user to accidentally get a shock. Further, such devices typically are not also usable for recharging portable electronic devices and laptop computers.

In view of the foregoing, there is a need for a portable charger that can be used to charge a car battery, laptop computers and variety of portable electronic devices, including but not limited to smart phones, mobile phones, data tablets, music players, cameras, camcorders, gaming units, e-books, Bluetooth® headsets and earpieces, GPS devices, and the like, either individually or simultaneously in various combinations, while still being easily portable itself. Accordingly, there is a need for such a charger that has high charge capacity—i.e., on the order of 10,000 to 15,000 mAh—while still being portable, of a compact size, and easy to use in various conditions and locations to charge a car battery, charge a computer, and charge one or more electronic devices simultaneously, including but not limited to in a house or office, a car or an airplane, as well as on-the-go, without compromising operation, performance or appearance. Still further, there is a need for a portable charger that can be easily recharged from an external power source, providing increase flexibility and convenience of use for the portable charger. Still further, there is a need for a portable charger system or kit with fail-safes that avoid the connection and electrical problems of conventional power chargers that contribute to shortened use and durability of the portable charger. Accordingly, it is a general object of the present invention to provide a portable charger system or kit that improves upon conventional power chargers currently on the market, especially car battery chargers, and that overcomes the problems and drawbacks associated with such prior art chargers.

SUMMARY OF INVENTION

Certain embodiments of the present invention provide a jump-start kit including a control unit operatively connected to a portable power bank for charging various devices, including jump starting a car battery, charging laptop computers and a variety of electronic devices, including but not limited to smart phones, mobile phones, data tablets, music players, cameras, camcorders, gaming units, e-books, Bluetooth® headsets and earpieces, GPS devices, and the like, either individually or simultaneously in various combinations.

In general, such a control unit includes a housing with a jump-start button, a power button, and a battery state indicator LED at the outside of the housing. The control unit also includes an emergency floodlight, operated by a power switch, on the outside of the control unit housing. In certain embodiments, the control unit includes two emergency floodlights.

Additionally, the control unit may include an ignition connection port provided to connect the control unit to a car battery for jump starting using jumper cables with positive and negative alligator clips inserted into the port. Specially designed terminal end contact points are provided on the alligator clips to allow for output energy to be distributed across the clip teeth.

In preferred embodiments of the present invention, the control unit may include one or more connectors, such as an EC3 connector, for connecting to the power bank and providing a 12 V battery output to the jumper cables. The at least one connector can further include sensing pins that are used to only allow output power when the at least one connector is inserted into the power bank.

In certain embodiments of the present invention, the control unit may include mounting means, such as a magnet, for affixing the control unit under a hood of a vehicle.

In certain other embodiments of the present invention, the portable power bank is a lightweight portable charger, such as designs shown and described in co-pending U.S. patent application Ser. No. 14/848,668, filed Sep. 9, 2015, and incorporated herein by reference.

In general, such a portable power bank/charger includes an internal rechargeable battery unit for connecting to and recharging one or more device in need of a power boost, as necessary, and at least one power connection port for connecting the charger unit with at least one such device, or an external power source, or both.

Additionally, the portable power bank may include one or more power connection ports that can act as power inputs, power outputs, or both, so as to be used for recharging the internal battery from an external power source connected to the charger via a connection port, or charge electronic devices connected to the charger via a connection port. The portable power bank may further be connected to an external power source and one or more electronic device at the same time, even using the same power connection port, without affecting operation of the charger to receive a charge from the external power source or supply a charge to the electronic devices.

In preferred embodiments of the present invention, the portable power bank is provided with a USB connection port, a DC connection port, and an ignition connection port. The USB connection port can act as a power output and is used for connecting the power bank with electronic devices and/or external power sources using appropriate charging cables and adapter units, as needed. In certain embodiments, multiple USB ports may be provided. Additionally, though shown and described as USB ports, the ports may use other known connection interfaces, such as micro-USB, mini-USB, Apple Lightning™, Apple 30-pin, or the like, without departing from the spirit and principles of the present invention.

The DC connection port can act as a power input and is used for connecting the power charger with external power sources using appropriate charging cables with AC/DC adapters, as needed. In an embodiment of the present invention, a separate DC input and DC output may be provided.

Power banks in accordance with the designs described and illustrated herein are readily portable as a result of the small, compact size of the power bank housing. Despite the small size of the portable power bank, the power capacity is very high so that the battery unit can accommodate a variety of devices in need of recharging, including multiple devices at the same time, if necessary. In preferred embodiments, the battery unit comprises a rechargeable Lithium-Ion battery having a power capacity in the range of about 57,165 mWh to about 57,720 mWh. Such power capacity allows the portable power bank to also be used to charge portable electronic devices. Moreover, such a power capacity level makes the present invention especially suitable for jump-starting a car battery.

The portable power bank also includes an emergency floodlight, controlled by a power switch on the charger housing. The portable power bank also includes a power indicator that will indicate the remaining capacity of the internal rechargeable battery unit in the power bank. For example, in an embodiment of the present invention, the power indicator means comprises a series of four LED lights, but can include more or fewer lights without departing from the principles and spirit of the present invention. When the battery is at "full" capacity—i.e., electric quantity between about 76% and about 100%—all the lights will be lit up. As the battery power decreases, the lights will correspondingly decrease by one as the power is used—e.g., three lights indicates electric quantity between about 51% and about 75%; two lights indicates electric quantity between about 26% and about 50%; and one light indicates electric quantity less than or equal to about 25%. Alternatively, the power indicator means can comprise a digital interface that provides a battery capacity level for the internal rechargeable battery unit, or another known means of providing battery level information. The power bank also comprises a controller or microprocessor, including a processing unit, configured to execute instructions and to carry out operations associated with the power bank. For example, the processing unit can keep track of the capacity level of the battery unit, store data or provide a conduit means by which data can be exchanged between electronic devices, such as between a smart phone and a computer. The processing unit communicates with the battery unit to determine how much capacity is remaining in the battery. Upon determining the capacity level, the processing unit can communicate with the power indicator means to provide the user with information for how much capacity is remaining in the internal rechargeable battery unit and whether the charger needs to be connected to an external power source for recharging.

Similarly, the control unit also includes a power indicator that will indicate the remaining capacity of the internal rechargeable battery unit in the power bank. For example, in an embodiment of the present invention, the power indicator means comprises a battery state indicator LED which will illuminate GREEN if the power bank is ready to supply power and illuminate RED if the power bank needs to be recharged. The control unit also comprises a controller or microprocessor, including a processing unit, configured to execute instructions and to carry out operations associated with the power bank. For example, the processing unit of the control unit communicates with the battery unit to determine how much capacity is remaining in the battery.

Upon determining the capacity level, the processing unit can communicate with the power indicator means to provide the user with information for how much capacity is remaining in the internal rechargeable battery unit and whether the charger needs to be connected to an external power source for recharging.

In certain embodiments of the control unit, connector cables operatively communicating with the portable power bank can be provided with the control unit housing, and in some embodiments, storable within cavities formed in the control unit housing from which they can be removed to connect to the portable power bank. Still further, such charging cables can be removable and replaceable so that varying connector interfaces—e.g., USB, Micro-USB, mini-USB, Apple Lightning, or Apple 30-pin—can be used with the portable power charger.

In certain embodiments of the portable power bank, a wireless transmitter and/or receiver can be included in the charger housing for wirelessly recharging the internal batteries of portable electronic devices that have an appropriate wireless receiver or wirelessly recharging the internal battery of the power charger from a wireless recharging station, such as designs shown and described in co-pending U.S. patent application Ser. No. 14/220,524, filed Mar. 20, 2014, and incorporated herein by reference.

Certain exemplary embodiments of the invention, as briefly described above, are illustrated by the following figures.

DETAILED DESCRIPTION

Figure 1:
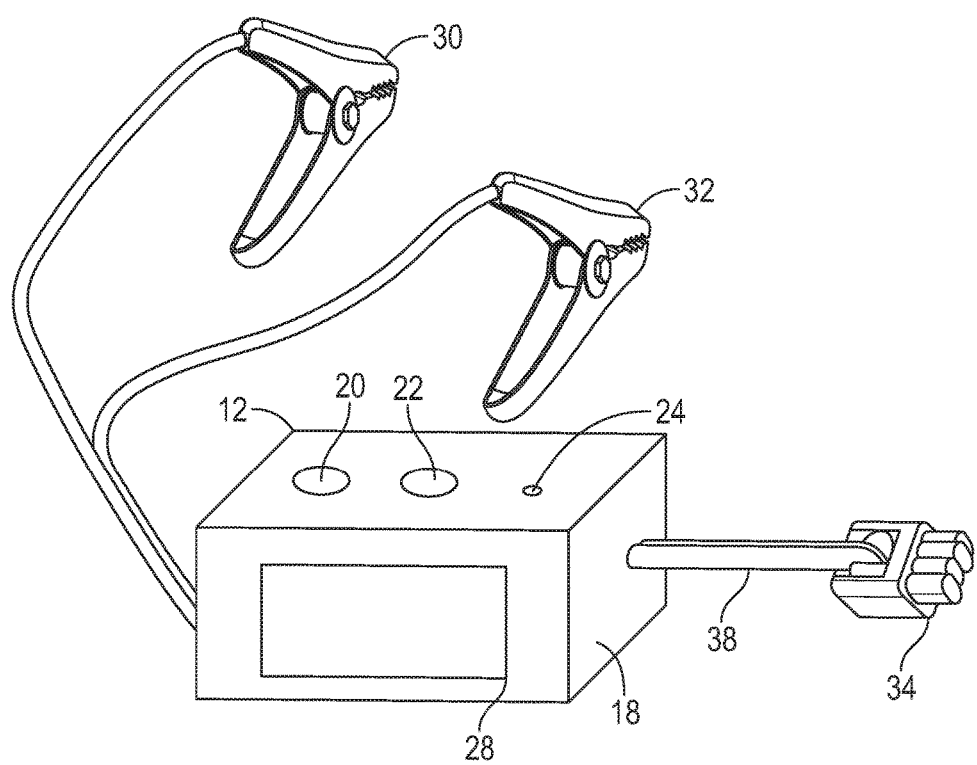
FIG. 1 shows in perspective view a control unit.
Figure 2:
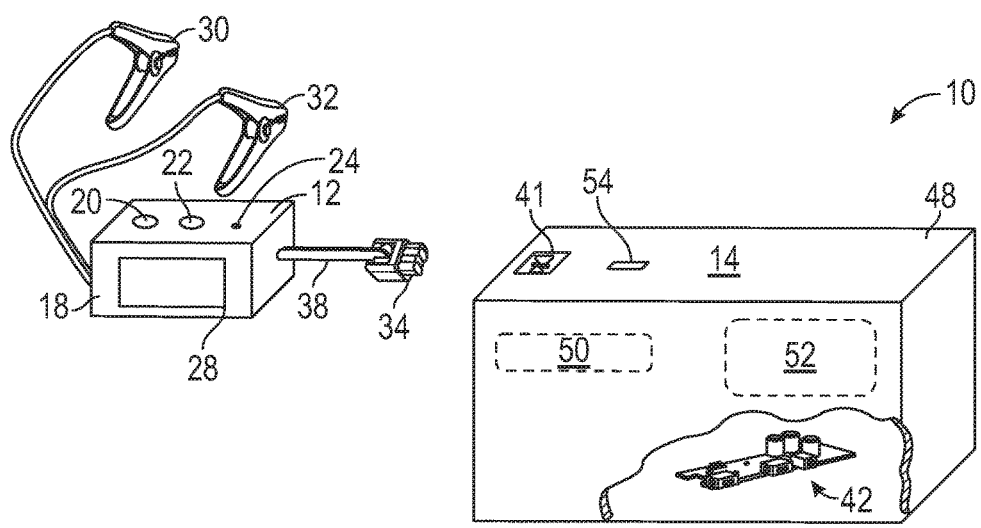
FIG. 2 shows in perspective view the control unit of FIG. 1 and a portable power bank with a cross-sectional cut-away of a safety circuit.

FIGS. 1 and 2 show a jump-start kit 10 including a control unit 12 and a power bank 14. When used together, the control unit 12 and power bank 14 are capable of jump starting a 12 V car battery as well as charging 5 V portable electronic devices.

Referring to FIG. 1, the control unit 12 comprises a housing 18. At the outside of the housing 18 are a jump-start button 20, a power button 22, a battery safety charge state indicator LED 24 and a lamp 28 (e.g., an LED or fluorescent lamp). Extending from the housing 18 are positive and negative 12 V jumper cable clips 30, 32. Also extending from the housing 18 are one or more connectors 34, such as an EC3 connector, an EC5 connector, or both, to connect the control unit 12 with the power bank 14 and provide a 12 V battery output to jumper cable clips 30, 32. The connector 34 may be connected to the control unit 12 through cables 38.

Inside the housing 18, the control unit 12 houses a safety circuit 40 (shown in FIG. 3) that operatively connects the power bank 14 with the jumper cable clips 30, 32.

Generally, the safety circuit 40 enables operative connection of the jumper cable clips 30, 32 with the power bank 14 via the control unit 12 when there is a voltage differential of at least about 11 V across the positive and negative jumper cable clips 30, 32. The safety circuit 40 interrupts at least the operative connections of the jumper cable clips 30, 32 with the power bank 14 in case any of the following shut off conditions occurs: insufficient voltage across the positive and negative jumper cable clips 30, 32; reverse polarity of the positive and negative charger clips 30, 32; reverse current to the power bank 14; or excess temperature of the power bank 14.

To implement the above-described functionality, the safety circuit 40 initiates a jump-start safety check sequence 100 (further described below with reference to FIG. 11) in response to a user actuation of the jump-start button 20.

In alternative embodiments, a mechanical sensing switch, such as a depressible port 41 shown in FIG. 2, knows when the connector 34 is inserted into the power bank 14 and closes a circuit to initiate the jump-start safety check sequence 100. In some embodiments an electrical sensing switch, such as port 41, knows when the connector 34 is inserted into the power bank 14 by, for example, detecting power from a power source within the control device 12. In certain embodiments, there may be a combination of a mechanical sensing switch and an electrical sensing switch so that, for example, insertion of the connector 34 into port 41 initiates a first safety check through a mechanical sensing switch and initiates a second safety check through an electrical sensing switch.

In certain embodiments, the safety circuit 40 can essentially operate on its own, performing the various interruptions while only using the power bank 14 as a battery.

In certain embodiments, the safety circuit 40 can communicate and coordinate with a supplemental safety circuit 42 (shown in FIG. 2) of the power bank 14 to perform the safety check sequence 100 and associated functionality as well as other communication functions. For example, the control unit 12 and power bank 14 can coordinate the supply of charge so that the power bank 14 is not always supplying a live output of 12 V.

Additionally, the safety circuit 40, supplemental safety circuit 42, or both may act to confirm if jumper cable clips 30, 32 are in proper placement about car battery terminals and if so, switch on power fed from the power bank 14 to the jumper cable clips 30, 32 via the control unit 12, or from the control unit 12 to the jumper cable clips 30, 32.

In the above example, the jumper cable clips 30, 32 are auto-sensing spark prevention jumper cable clips 30, 32 containing sensing circuitry that is activated based on the clip clamp/teeth design. Accordingly, only clips 30, 32 that are properly connected to the car battery terminals could supply a 12 V current.

The safety circuit 40 of the control unit 12 may communicate and coordinate with the supplemental safety circuit 42 of the power bank 14 to adjust the feed of power or shut off the portable power bank if the car battery is recharged or a safety/emergency condition exists or is sensed.

Referring to FIG. 2, the power bank 14 includes a case 48. Inside the case 48, the power bank 14 houses a charger battery 50 (e.g., a lithium ion type battery), a power supply 52 that is operatively connected with at least one terminal of the charger battery 50, with at least one USB output jack 54 for providing +5V USB power, and with port 41 for providing about +12 V DC power.

The charger battery 50, in certain embodiments, can be a series-connected three-cell lithium ion polymer battery rated at 3.7 V per cell (11.1 V total), capable of 400 A peak current, in excess of 57000 mWh capacity, with charging circuitry to support a charge voltage of 19 V. Such specifications enable the portable power bank 14 to be of moderate size, i.e. less than 30 cm along any edge, while also being capable of at least three jump start attempts on a 12 V car battery. The power supply 52 allows up to 400 Amp of peak current to be drawn for jump-starting an automotive battery that is connected to a vehicle. Additionally, the power supply 52 provides 5 V DC output to the USB jacks.

After actuation of the jump-start button 20, and upon successful completion of the jump-start safety check sequence 100, the power bank 14 provides 12 V DC current from the power supply 52 to the jumper cable clips 30, 32. Moreover, upon completion of the jump-start safety check sequence 100 the power bank 14 remains ready to provide 12 V DC current for a pre-determined period of time.

For example, during the pre-determined period of time the power bank 14 provides 12 V DC current from the charger battery 50 to the jumper cable clips 30, 32 in response to a second user actuation of the jump-start button 20. For example, the pre-determined period of time is sufficient for three discrete jump-start attempts. According to certain embodiments, the power bank 14 discontinues readiness after three discrete jump-start attempts.

Referring to FIGS. 3-7, the safety circuit 40 comprises a jump-start relay 62, a microprocessor 64, a voltage input analyzer 66, a differential voltage amplifier 68, a reverse polarity detector 70, a reverse current protector 72, and a thermistor 74 that are operatively connected with the microprocessor 64 to enable or disable the jump-start relay 62.

More particularly, a port PD1 of the microprocessor 64 is operatively connected to actuate a transistor 76, which energizes or de-energizes the jump-start relay 62. The microprocessor 64 also is configured to execute instructions and to carry out operations associated with the portable power bank 14. For example, the processing unit can keep track of the capacity level of the battery unit, store data or provide a conduit means by which data can be exchanged between electronic devices, such as between a smart phone and a computer. The processing unit communicates with the battery unit to determine how much capacity is remaining in the battery. Upon determining the capacity level, the processing unit can communicate with the battery state indicator LED 24 in order to display information for how much capacity is remaining in the charger battery 50 and whether the charger needs to be connected to an external power source for recharging. In certain embodiments, the battery state indicator LED 24 will illuminate GREEN if the jump-start kit 10 is ready to supply power, and illuminate RED if the power bank 14 needs to be charged.

Figure 3:
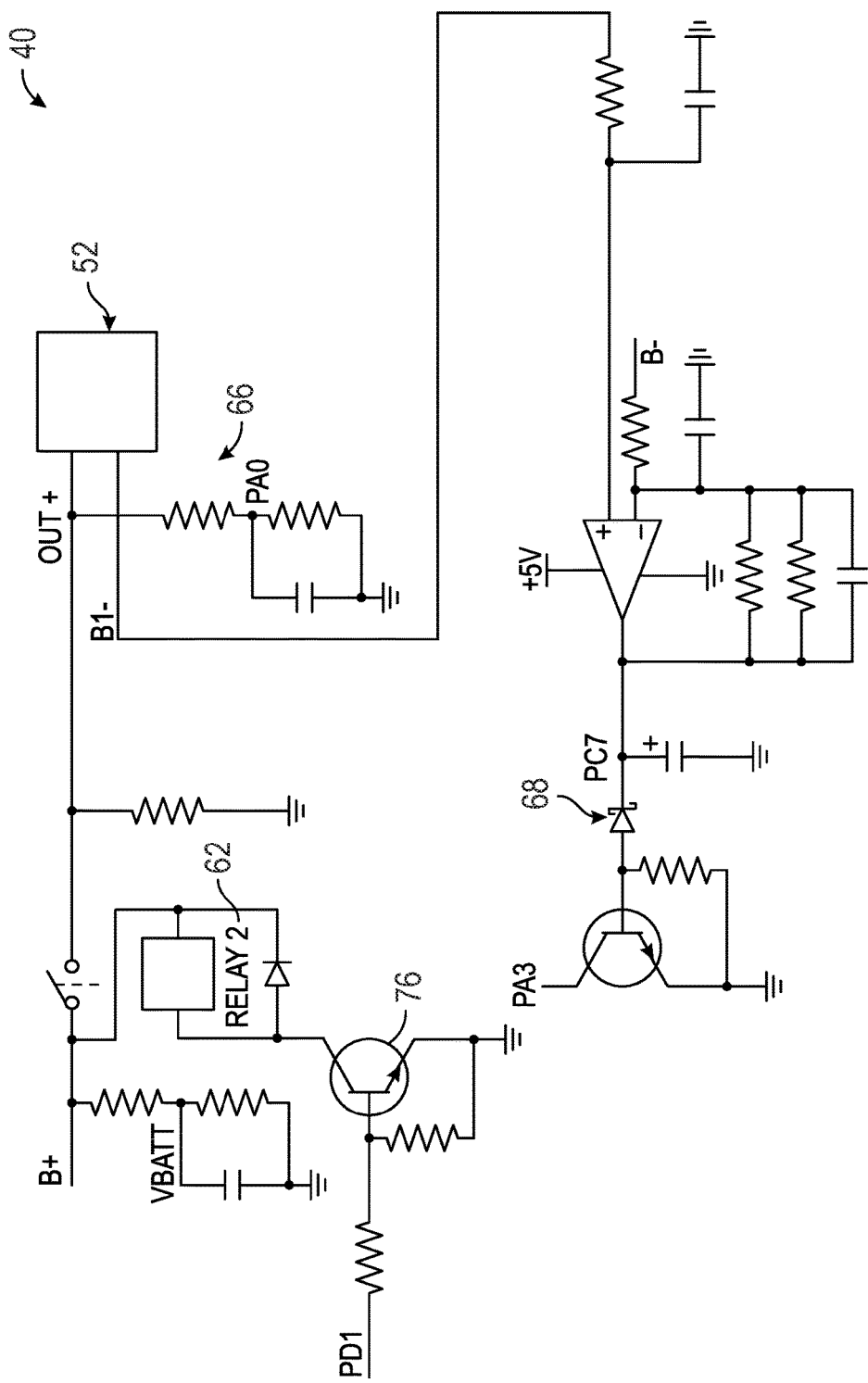
FIG. 3 shows a safety circuit schematic of either the control unit of FIG. 1 or the portable power bank of FIG. 2.

FIG. 3 shows the voltage input analyzer 66, which is operatively connected between the jumper cable clips 30, 32. The voltage input analyzer 66 includes a voltage divider so that it sends to a port PA0 of the microprocessor 64 a fraction of the voltage across the terminals of a vehicle battery to be charged. In case there is a sufficient voltage differential (the jumper cable clips 30, 32 are connected to a battery), then the fractional voltage from the voltage input analyzer 66 will cancel a default LOW signal at microprocessor port PA0 with the result that the microprocessor 64 will have one of the inputs required in order to energize or enable the jump start relay 62. Thus, the safety circuit 40 and/or supplemental safety circuit 42 can enable the operative connection of the jumper cable clips 30, 32 to the charger battery 50, only if the charger battery 50 voltage is satisfactory.

FIG. 3 also shows the differential current amplifier 68, which compares the negative terminal voltages of the charger battery 50 and of the vehicle battery to be charged, and sends a HIGH signal to port PC7 of the microprocessor 64 in case the charging current exceeds a tolerance threshold. Moreover, in case the differential current amplifier output exceeds a breakthrough voltage of a Zener diode 78, then the output gates a transistor 80 to cause a LOW signal at port PA3 of the microprocessor 64. These two signals disable the microprocessor 64 from energizing or enabling the jump-start relay 62. Thus, the safety circuit 40 and/or supplemental safety circuit 42 can enable the operative connection of the jumper cable clips 30, 32 to the charger battery 50, only if the negative terminal voltages match within the pre-determined tolerance threshold.

Figure 4:
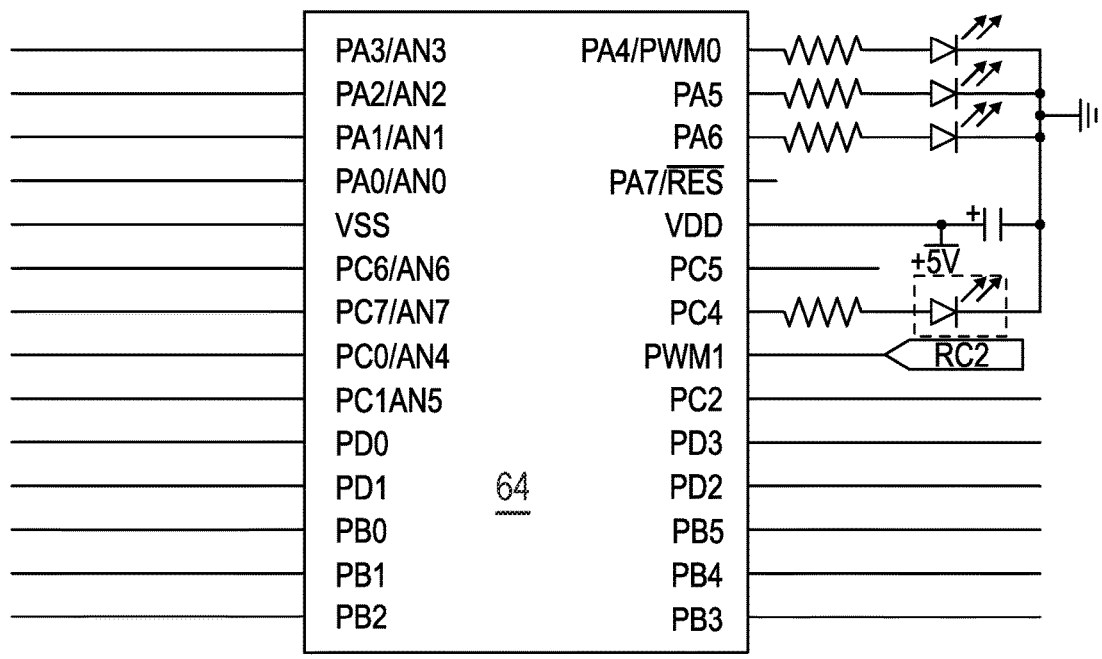
FIG. 4 shows a microprocessor pinout of either the control unit of FIG. 1 or the portable power bank of FIG. 2.

FIG. 4 shows the microprocessor 64, which includes the following ports—PA3: ND port battery temperature detection; PA2: A/D port battery voltage detection; PA1: ADI 5V USB current detection; PA0: Out-check external voltage detection; VSS: GND; PC6: V2 charging voltage detection; PC7: V4 battery current output detection; PC0: V5 charging voltage and battery voltage detection; PC1: V3 back to the charging current detection; PD0: on/off port; PD1: relay control port; PB0: reverse battery detection; PB1: LED on/off control; PB2: jump bottom control; PB3: light bottom control; PB4: jump green light control; PB5: jump red light control; PD2: on/off light control; PD3: USB output control; PC2: on/off bottom voltage control; PWM1: PWM signal output; PC4: LED battery indicator control; VDD: VCC; and PA6-PA4: LED battery indicator control.

Figure 5:
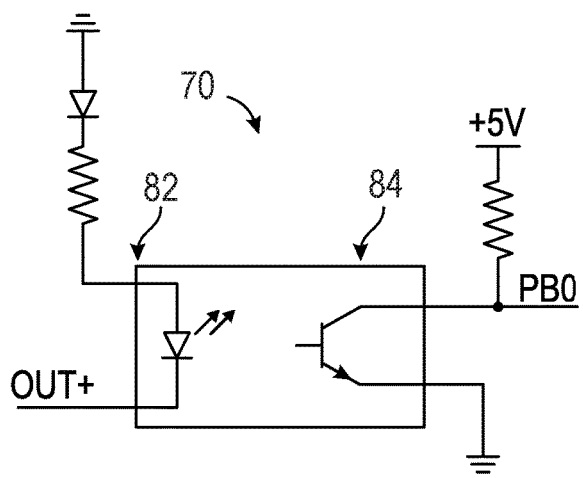
FIG. 5 shows a reverse polarity detector of either the control unit of FIG. 1 or the portable power bank of FIG. 2.

FIG. 5 shows the reverse polarity detector 70, which may include a light emitting diode 82 that is connected in electrical series between ground and the positive jumper cable clip 30, and may also include a phototransistor 84 in optical communication with the light emitting diode 82 and connected in electrical series between ground and a reverse polarity detection terminal PB0 of the microprocessor 64. In case the jumper cable clips 30, 32 are connected backwards, i.e. the positive jumper cable clip is connected to a negative terminal of the vehicle battery to be charged, then reverse polarity will be detected by energization of the light emitting diode 82 and corresponding conduction by the phototransistor 84. This will cause a LOW signal at the microprocessor port PB0, which will cancel the inputs required in order to energize or enable the jump-start relay 62. Thus, the safety circuit 40 and/or supplemental safety circuit 42 disable the operative connection of the jumper cable clips 30, 32 to the charger battery 50, in case the jumper cable clips 30, 32 are connected backwards to the vehicle battery.

Figure 6:
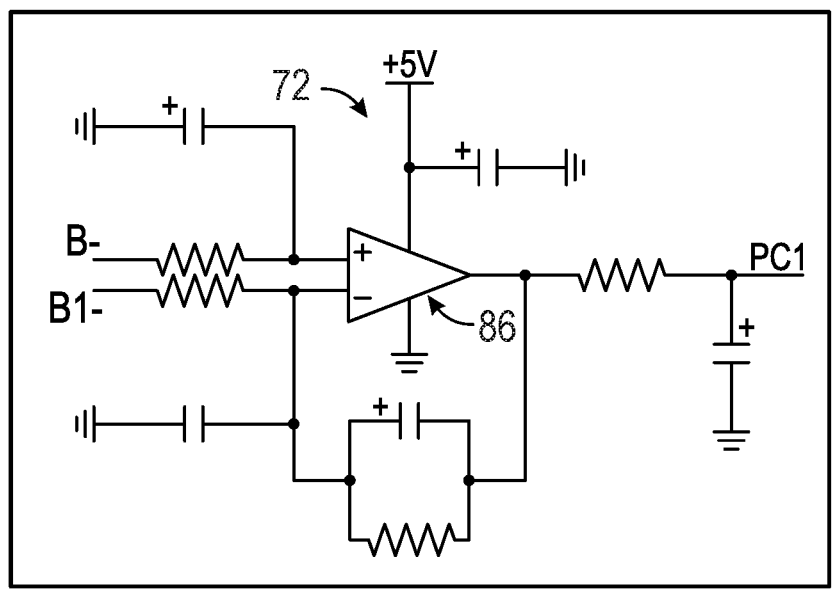
FIG. 6 shows a reverse current protector of either the control unit of FIG. 1 or the portable power bank of FIG. 2.

FIG. 6 shows the reverse current protector 72, which may incorporate an operational amplifier 86 operatively connected between the charger battery 50 negative terminal and the negative jumper cable jack 32. In case the voltage differential across the op amp 86 reverses, then the reverse current protector 72 sends a HIGH signal to port PC1 of the microprocessor 64, which will cancel the inputs required in order to energize or enable the jump start relay 62. Thus, the safety circuit 40 disables the operative connection of the jumper cable clips 30, 32 to the charger battery 50, in case the vehicle battery begins to send current back through the charger battery.

Figure 7:
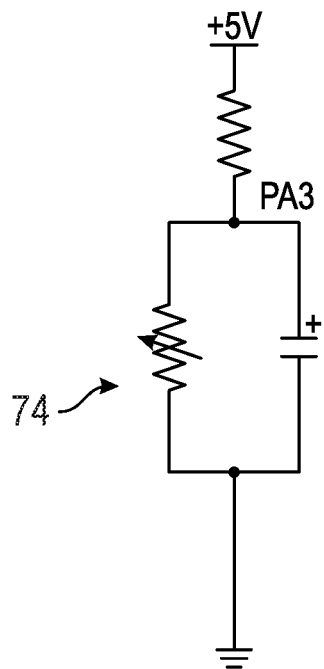
FIG. 7 shows a temperature control circuit of either the control unit of FIG. 1 or the portable power bank of FIG. 2.

FIG. 7 shows the thermistor 74 (or equivalent temperature-sensing circuitry) is mounted adjacent the charger battery 50 and is operatively connected with the microprocessor 64 to provide a LOW signal at PA5 in case the charger battery temperature exceeds a pre-determined threshold. Thus, the safety circuit 40 and/or supplemental safety circuit 42 disable the operative connection of the jumper cable clips 30, 32 to the charger battery 50, in case the charger battery exceeds a pre-determined temperature.

Figure 8:
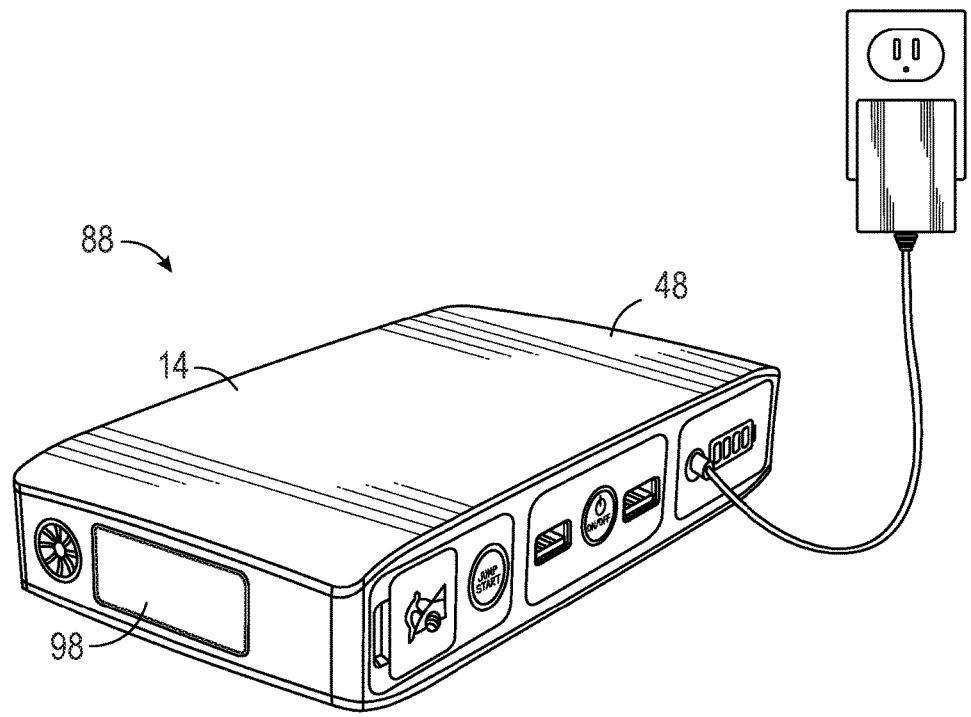
FIG. 8 shows in perspective view a second portable power bank.
Figure 9:
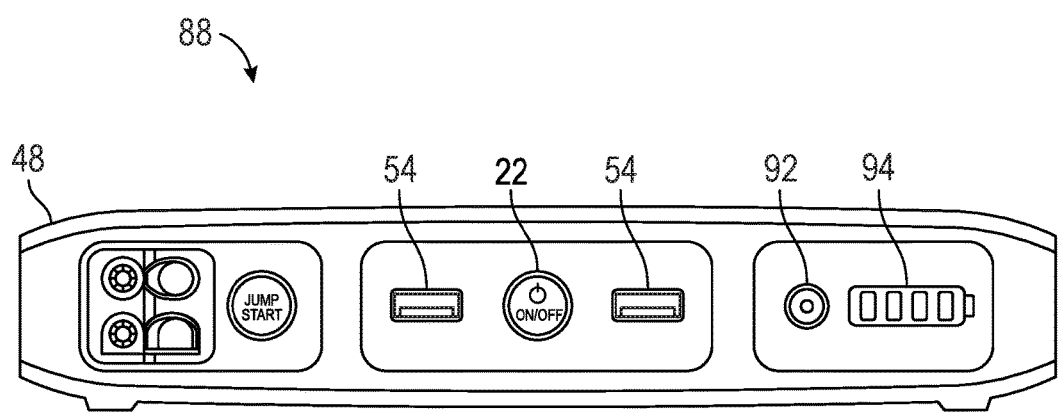
FIG. 9 shows in front view the portable power bank of FIG. 8.
Figure 10:
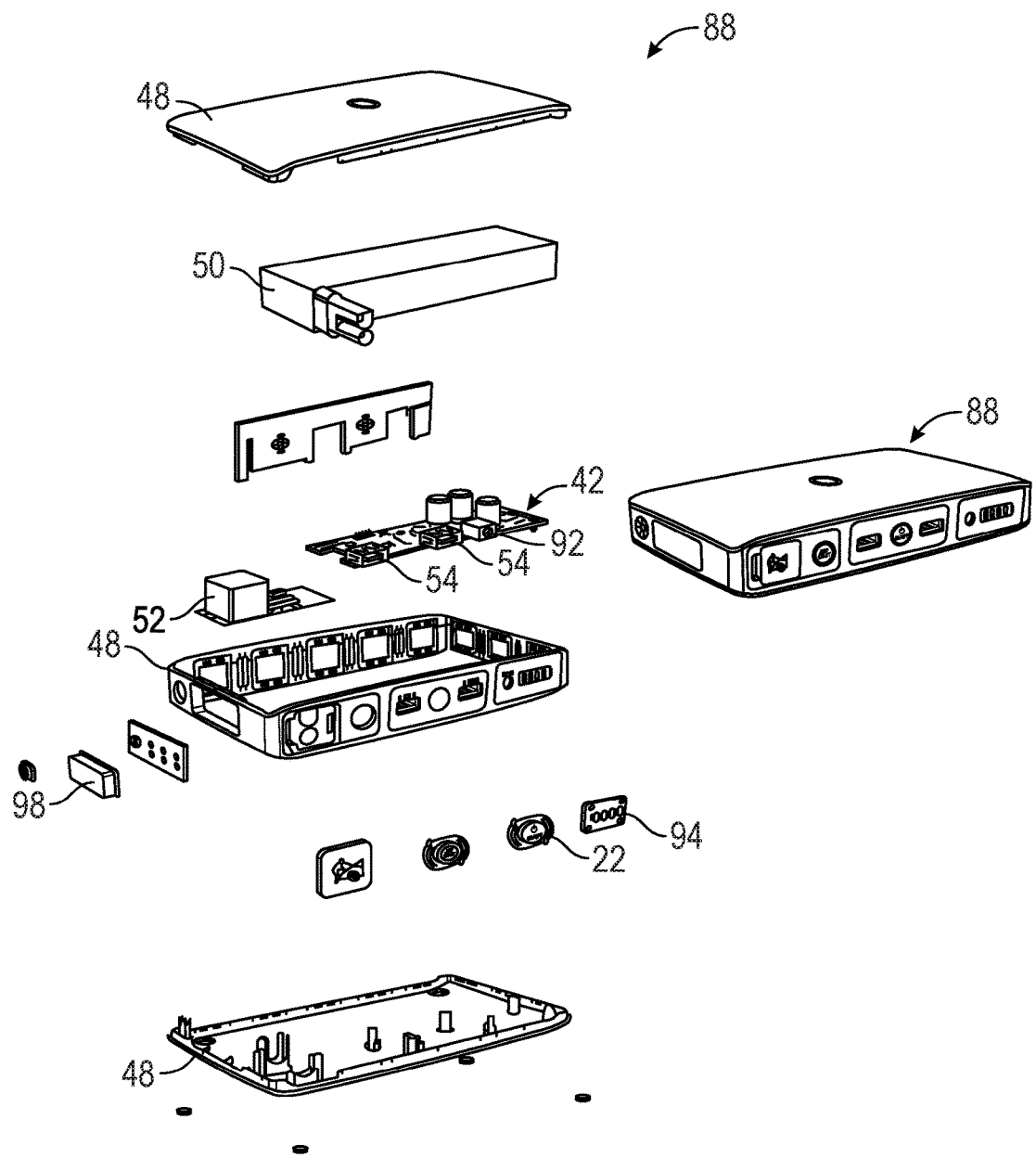
FIG. 10 shows in exploded assembly view the portable power bank of FIG. 8.

FIGS. 8-10 show a portable charger 88 according to an embodiment of the present invention, which is capable of jump starting a 12 V car battery as well as charging 5 V portable electronic devices. Other components of the portable charger 88 are similarly numbered to, and similar to, those described with reference to FIGS. 2-7. The portable charger 88 comprises a case 48. At the outside of the case 48 is at least one 5 V USB output jack 54. Also at the outside of the case 48 are a power button 22, a 19 V DC charging jack 92, battery level indicator LEDs 94, and a lamp 98 (e.g., an LED or fluorescent lamp).

In certain embodiments the portable charger 88 includes a second lamp (e.g., LED or fluorescent) actuated by depressing the power button 22.

FIG. 10 shows an exploded assembly view of the portable charger 88. Inside the case 48, the portable charger 88 houses a charger battery 50 (e.g., a lithium ion type battery), a power supply 52 that is operatively connected with at least one terminal of the charger battery 50, with the at least one USB output jack 54 for providing +5V USB power, and with the supplemental safety circuit 42 that operatively connects the power supply 52 with the safety circuit 40 and jumper cable clips 30, 32 (shown in FIG. 1). All these components are in common between either of the power bank 14 or portable charger 88, thus, what is described with reference to FIG. 10 for the portable charger 88 as shown in FIGS. 8 and 9, applies equally to the power bank 14 as shown in FIG. 2.

Figure 11:
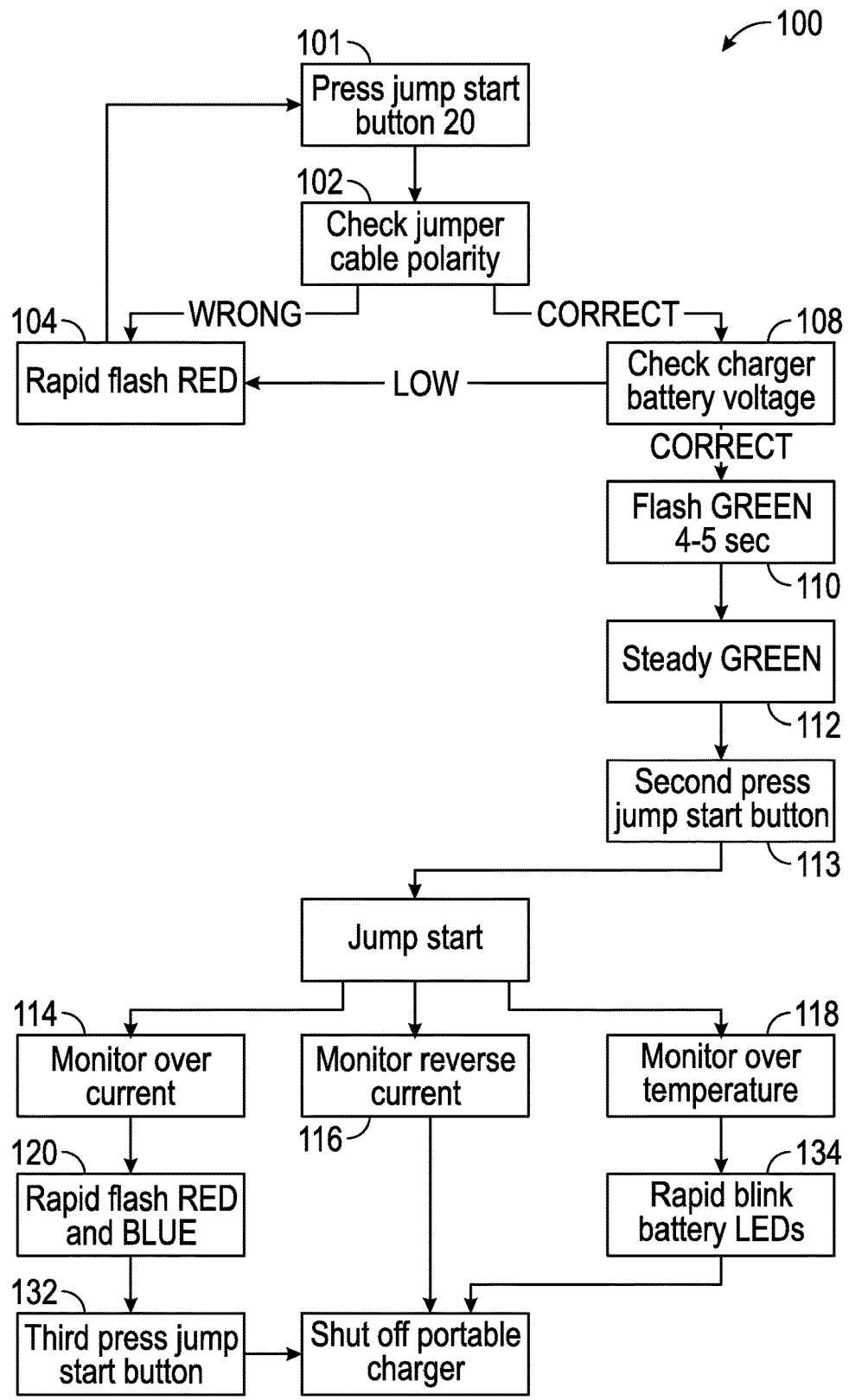
FIG. 11 shows a flowchart of a method of use and operation of the control unit of FIG. 1, the portable power bank of FIG. 2 or the portable power bank of FIG. 8.

FIG. 11 shows a flowchart of the jump-start safety sequence 100. At a step 101, press the jump-start button 20 on the portable control unit 12. Pressing the jump-start button 20 initiates the jump-start safety check sequence 100. At step 102, the safety circuit 40 checks jumper cable polarity using the reverse polarity detector 70. The jump-start button 20 will rapidly flash 104 RED if cables are not connected correctly. If cables are correctly connected, then the safety circuit 40 will check 108 for adequate charger battery 50 voltage using the voltage input analyzer 66. The voltage input analyzer circuit 66 sends signals to pins PA0, PC5 of the microprocessor 64, which receives the fractional voltage from the charger battery 50 positive terminal in order to assess the voltage differential from the charger battery positive terminal to the negative terminal of the battery that the portable power bank 14 will be used to jump start. If a voltage is not detected, the safety circuit 40 will signal the microprocessor 64 to disable the jump-start relay 62. On the other hand, if the microprocessor 64 senses at least a minimum voltage differential, it will then enable the jump-start relay 62.

Thus, in case charger battery voltage also is satisfactory, then the jump start button 20 will flash 110 GREEN for about 4 seconds if the jump start cable clips 30, 32 are correctly connected to the vehicle battery to be charged. Then after 4-5 seconds the portable power bank 14 will enter 112 jump start ready state. When the jump-start button 20 goes from flashing GREEN to steady GREEN the portable charger is ready to attempt a car start.

The microprocessor 64 will maintain the safety circuit 40 and the portable power bank 14 in a state of readiness for jump-start during a pre-determined period of time (e.g., up to 5 minutes) in order to allow for multiple attempts to jump start (e.g., at least three attempts). In case a jump-start is not attempted before the 5 minutes has elapsed, then the microprocessor 64 will shut down the portable power bank 14 by disabling the relay 62. On the other hand, in case a jump-start is attempted and the engine fails to start, the microprocessor 64 will permit a pre-determined number of attempts (e.g., total of 3) before turning off the portable power bank 14.

From the jump-start ready state, charging can be initiated by a second press 113 of the jump-start button 20. Once charging has been initiated, the safety circuit 40 continuously monitors 114 for over current using the differential current amplifier 68 and also monitors 116 for reverse current using the reverse current protector 72.

In case the current draw from the charger battery 50 is over 30 A for more than 30 seconds during a jump start, the safety circuit 40 will rapidly flash 120 the jump-start button 20 RED and the power button 22 BLUE. Design peak current draw for jump starting, running car lights, accessories, etc. is about 70 A. Therefore, on detecting a successful start, the microprocessor 64 will allow a current draw up to 70 A for up to 4 seconds.

In case the jump-start button 20 is indicating a rapid flash RED, then a user can press the jump-start button a third time 132 to shut off the portable power bank 14. The user then can check cable connections (i.e. 34) and can press 101 the jump-start button again to restart the jump-start safety check sequence.

Additionally, the safety circuit 40 monitors 118 for over temperature using the thermistor 74. In case the control unit 12 and/or portable power bank 14 senses an over temperature condition of the charger battery 50, all four battery charge level LEDs 94 will blink 134 rapidly for several seconds. The jump-start sequence will be disabled until the charger battery 50 has cooled to a safe temperature range, i.e. less than about 65° C.

Thus, embodiments of the invention provide a portable power bank 14 and charger 88 that are capable of jump starting a 12 V car battery as well as charging 5 V portable electronic devices. The portable power bank 14 and charger 88 include a charger battery; a power supply operatively connected with at least one terminal of the charger battery; a safety circuit operatively connected with the power supply; at least one USB output jack operatively connected with the power supply, via the safety circuit, for providing +5V USB power; and positive and negative jumper cable jacks operatively connected with the power supply, via the safety circuit, for providing +12 V DC power to jump start a vehicle battery.

With the addition of the external control unit 12, the charging capabilities of the present invention are improved. For example, a user can have a series of power banks of different sizes, shapes, and power capacities. The external control unit 12 can be adapted for use with all different power banks, and house the control circuitry for drawing a charge from whatever power bank is used and direct it to the battery in need of a charge via the jumper cables 30, 32 provided with the external control unit 12. As noted, control circuitry can be provided in the control unit 12 alone, or in both the control unit 12 and the power bank 14, whereby the respective circuitry can coordinate for operation of the charging kit 10.

Although exemplary embodiments of the invention have been described with reference to attached drawings, those skilled in the art nevertheless will apprehend variations in form or detail that are consistent with the scope of the invention as defined by the appended claims.

What is claimed is:

1. A portable jump-start kit configured to jump start a 12 V car battery comprising:
   (1) a portable power bank comprising:
      a first housing having a rechargeable battery internally stored therein;
      a first power connection port operatively connected to the rechargeable battery and being capable of providing a 5 V power charge therefrom; and
      a second power connection port operatively connected to the rechargeable battery and being capable of providing 12 V DC power charge therefrom;
   (2) a control unit independent of the portable power bank and connectable therewith via a power input charging cable adapted for engagement with the second power connection port of the power bank to connect the control unit with the power bank, said control unit comprising:
      a second housing;
      a power output charging cable means connected to the second housing and having positive and negative jumper cable clips on the end thereof adapted for connection to a 12 V car battery for jump starting said battery; and
      a control button disposed on the second housing for controlling the supply of the 12 V DC power charge received from the power bank via the power input charging cable to the power output charging cable means; and
   (3) a safety circuit housed within either of the first and second housings, said safety circuit being in operative communication with the control button and comprising:
      a jump start relay operatively connecting the 12 V DC power charge received from the portable power bank to the positive and negative jumper cable clips of the control unit via the power output charging cable means;
      a microprocessor; and
      a voltage input analyzer operatively connected with the microprocessor to enable or disable the jump start relay.

2. The jump-start kit of claim 1, wherein the second power connection port is continuously powered after depressing the control button.

3. The jump-start kit of claim 1, wherein the second power connection port is only powered when the power input charging cable is engaged with the second power connection port.

4. The jump-start kit of claim 1, wherein the power input charging cable is an EC3 connector.

5. The jump-start kit of claim 1, wherein the power input charging cable is an EC5 connector.

6. The jump-start kit of claim 1, wherein the control unit further comprises a lamp disposed on the second housing.

7. The jump-start kit of claim 1, wherein the control unit further comprises two lamps disposed on the second housing.

8. The jump-start kit of claim 1, wherein the safety circuit initiates a jump-start safety check sequence in response to a user actuation of the control button.

9. The jump-start kit of claim 1, wherein the second power connection port is depressible for initiating a jump-start safety check sequence.

10. The jump-start kit of claim 1, wherein the second power connection port is an electrical switch for initiating a jump-start safety check sequence.

11. The jump-start kit of claim 1, wherein the safety circuit further comprises:
   a reverse polarity detector;
   a reverse current protector; and
   a temperature sensitive circuit,
   wherein the safety circuit interrupts at least the operative connections of the jumper cable clips with the power supply, in case any of the following shut off conditions occur:
      (i) insufficient voltage across the positive and negative jumper cable clips;
      (ii) reverse polarity of the positive and negative jumper cable clips;
      (iii) reverse current to the charger battery; or
      (iv) excess temperature of the charger battery.

12. The jump-start kit of claim 1, wherein the control unit further comprises a battery state indicator LED which illuminates when the portable power bank is ready to supply power.

13. The jump-start kit of claim 1, wherein the control unit further comprises a battery state indicator LED which illuminates when the portable power bank needs to be charged.

14. A portable jump-start kit configured to jump start a 12 V car battery comprising:
   (1) a portable power bank comprising:
      a first housing having a rechargeable battery internally stored therein;
      a first power connection port operatively connected to the rechargeable battery and being capable of providing a 5 V power charge therefrom; and
      a second power connection port operatively connected to the rechargeable battery and being capable of providing 12 V DC power charge therefrom; and
   (2) a control unit independent of the portable power bank and connectable therewith via a power input charging cable adapted for engagement with the second power connection port of the power bank to connect the control unit with the power bank, said control unit comprising:

a second housing;

a power output charging cable means having positive and negative jumper cable clips on the end thereof adapted for connection to a 12 V car battery for jump starting said battery;

a control button disposed on the second housing and in operative communication with a safety circuit housed within the second housing for controlling the supply of the 12 V DC power charge received from the power bank via the power input charging cable to the power output charging cable means; said safety circuit comprising:

a jump start relay operatively connecting the 12 V DC power charge received from the portable power bank to the positive and negative jumper cable clips of the control unit via the power output charging cable means;

a microprocessor; and a voltage input analyzer operatively connected with the microprocessor to enable or disable the jump start relay.

15. The jump-start kit of claim 14, further comprising a mounting means to attach the control unit under a hood of a vehicle.

16. The jump-start kit of claim 14, wherein the first housing houses a supplemental safety circuit that is in operative communication with the safety circuit housed within the second housing to coordinate the supply of 12 V DC charge to the second power connection port.

17. The jump-start kit of claim 16, wherein the supplemental safety circuit is in operative communication with the safety circuit to confirm if the jumper cable clips are in place around terminals of the car battery, and if so, switches on power to the jumper cable clips.

18. The jump-start kit of claim 16, wherein the supplemental safety circuit is in operative communication with the safety circuit to shut off power to the jumper cable clips if the car battery is recharged or a safety condition exists or is sensed.

19. The jump-start kit of claim 16, wherein the supplemental safety circuit comprises:

a reverse polarity detector;

a reverse current protector; and a temperature sensitive circuit, wherein the safety circuit and supplemental safety circuit coordinate to interrupt at least the operative connections of the jumper cable clips with the power supply, in case any of the following shut off conditions occur:

(i) insufficient voltage across the positive and negative jumper cable clips;

(ii) reverse polarity of the positive and negative jumper cable clips;

(iii) reverse current to the charger battery; or (iv) excess temperature of the charger battery.

20. The jump-start kit of claim 16, wherein the supplemental safety circuit initiates a jump-start safety check sequence in cooperation with the safety circuit in response to a user actuating the control button.

* * * * *